United States Patent [19]

Mosiewicz

[11] Patent Number: 4,618,313
[45] Date of Patent: Oct. 21, 1986

[54] AXIAL PROPELLER WITH INCREASED EFFECTIVE DISPLACEMENT OF AIR WHOSE BLADES ARE NOT TWISTED

[75] Inventor: Antonio Mosiewicz, Milan, Italy

[73] Assignee: Cofimco S.r.l., Milan, Italy

[21] Appl. No.: 539,382

[22] Filed: Oct. 6, 1983

Related U.S. Application Data

[63] Continuation-in-part of Ser. No. 228,972, Jan. 27, 1981, abandoned.

[51] Int. Cl.⁴ ............................................. B64C 11/18
[52] U.S. Cl. ..................... 416/237; 416/23; 416/62
[58] Field of Search ........... 416/237 R, 237 A, 237 B, 416/23, 232, 233, 235, 242, 62, 89 R, 89 A, 223 R; 244/124, 35 R, 213, 215, 198

[56] References Cited

U.S. PATENT DOCUMENTS

| | | | |
|---|---|---|---|
| 1,990,291 | 2/1935 | Larsen | 416/23 |
| 2,385,070 | 9/1945 | Gant | 416/237 R |
| 2,396,811 | 3/1946 | Bathras | 416/235 |
| 2,450,440 | 10/1948 | Mills | 416/23 |
| 3,215,370 | 11/1965 | Strydom | 416/23 |
| 3,635,590 | 1/1972 | Phillips | 416/242 |
| 3,697,193 | 10/1972 | Phillips | 416/223 |
| 3,902,821 | 9/1975 | Robinson | 416/23 |
| 4,146,200 | 3/1979 | Borzachillo | 244/215 |

FOREIGN PATENT DOCUMENTS

| | | | |
|---|---|---|---|
| 0331423 | 11/1935 | Italy | 416/23 |
| 0444829 | 2/1949 | Italy | 416/23 |

Primary Examiner—Everette A. Powell, Jr.
Attorney, Agent, or Firm—Stevens, Davis, Miller & Mosher

[57] ABSTRACT

According to the invention an increase of the effective displacement of air in an axial propeller, whose blades are not twisted, is achieved by applications of tab, substantially rigid, at the trailing edge of the blade, the maximum width of the tab being at the blade internal end.

8 Claims, 16 Drawing Figures

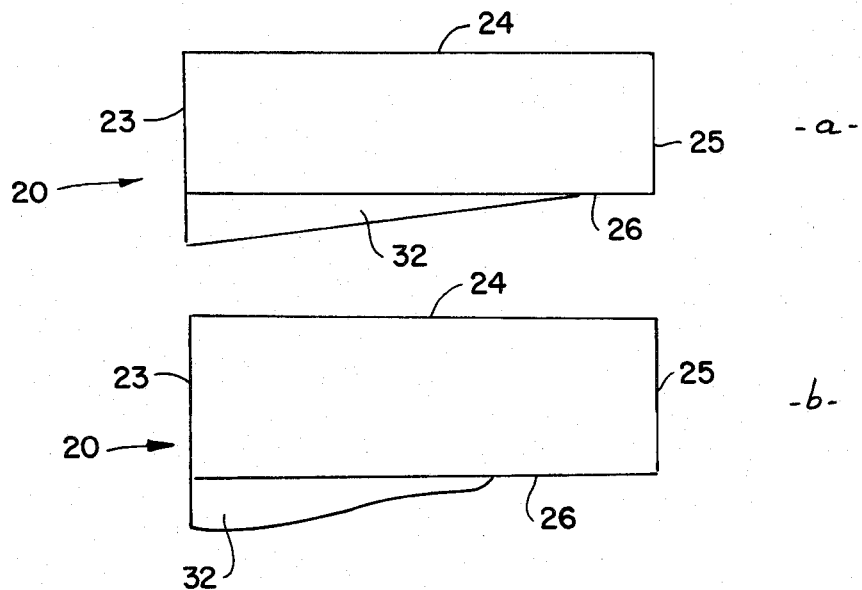
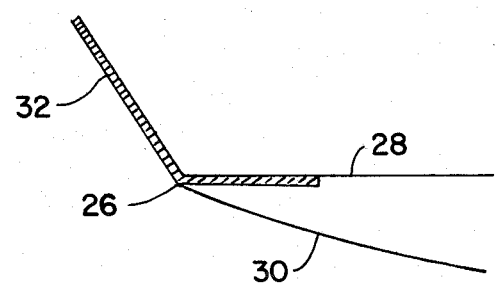

FIG 10 -a-
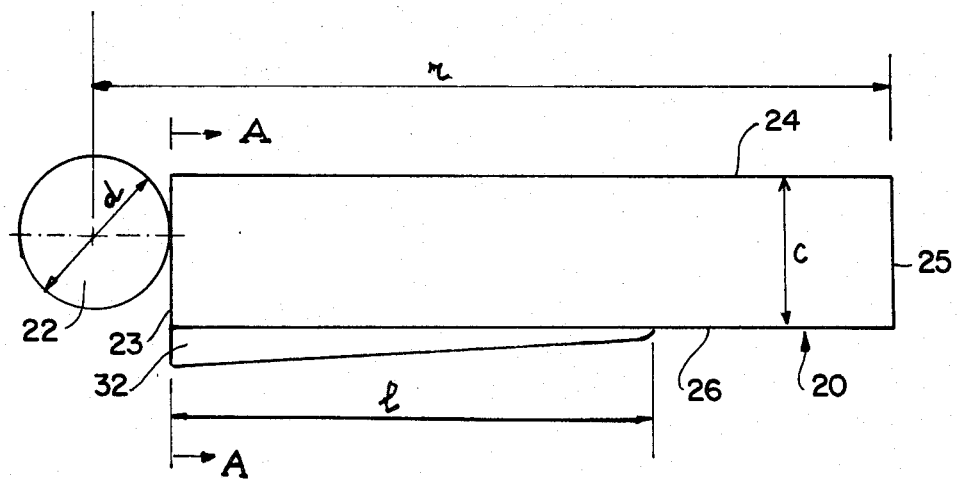
A-A
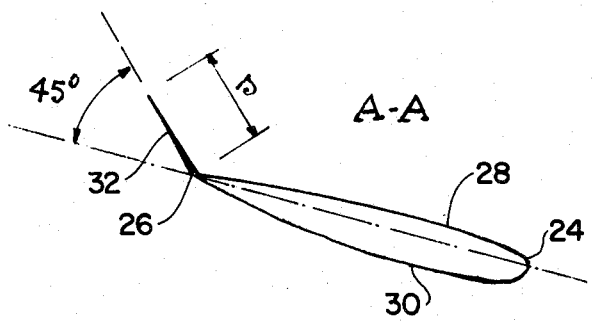
-b-

AXIAL PROPELLER WITH INCREASED EFFECTIVE DISPLACEMENT OF AIR WHOSE BLADES ARE NOT TWISTED

The present application is a continuation-in-part of U.S. patent application Ser. No. 228,972 filed Jan. 27, 1981 and subsequently abandoned.

BACKGROUND OF THE INVENTION

1. Field of the Invention

It is object of this invention to provide an axial propeller, whose blades are not twisted and are equipped, in coincidence with the trailing edge, with tabs having suitable dimensions and orientation, particularly in the blade zones with lower peripheral speed.

In this way an advantageous increase of the effective displacement of air of an axial propeller whose blades are not twisted, can be obtained, in particular at the blade zones with lower peripheral speed.

2. Description of the Prior Art

At present the increase of the effective displacement of air at the blade zones with lower peripheral speed is achieved by means of one of the following methods:

(a) Increase of the blade's chord (width) proceeding from the external end to the blade's root
(b) Blade's twist (=increase of the geometrical incidence angle of the blade's sections, proceding from the external end to the blade's root)
(c) Combination of the methods mentioned in (a) and (b).

Such techniques, which are used at present, exhibit the following inconveniences:

(1) The chord change of the blade's profile is not feasible on massive blades, manufactured by extrusion, and is complex with hollow blades particularly if reinforced.
(2) The twist of blades made of plastic material and obtained by extrusion is not feasible.
(3) The twist of blades made of light alloy and obtained by extrusion, shows the following inconveniences: necessity to exceed the yield point of the material; practical impossibility to reach suitable twist values (particularly on blades having shell section and low elongation ratio, defined as the ratio of the blade's length to the chord) without causing damage to the blade itself.

SUMMARY OF THE INVENTION

The present invention avoids the above mentioned inconveniences and provides other advantages, which will appreciated by those skilled in the art, as specified in the following description. According to the present invention, an increase of the lift coefficient of the blade profile (and consequently an increase of the effective displacement of air) of an axial propeller, whose blades are not twisted, can be achieved by means of tabs having suitable width and inclination, fastened at the trailing edge of the blades themselves.

Such increase depends on the width of the tab and on its inclination in relation to the profile chord.

Suitably combining the width of the tab with its inclination, increments of effective displacement of air by the blades can be achieved at the blade zones with lower peripheral speed, which are equal or higher in comparison with the increments obtained by means of the blade twist.

Under the same performance, the overall efficiency of the propeller equipped with the proposed devices (tabs) is equal or even slightly higher in comparison with the efficiency of a customary propeller with twisted blades.

BRIEF DESCRIPTION OF THE DRAWINGS

FIGS. 5a and b show still further embodiments of the present invention.

FIG. 6 shows a cross section of the tab secured to the blade.

FIGS. 10a and b show a specific example of a blade and tab, with FIG. 10b being a cross section taken along line A—A of FIG. 10a.

DETAILED DESCRIPTION

Figure 1:
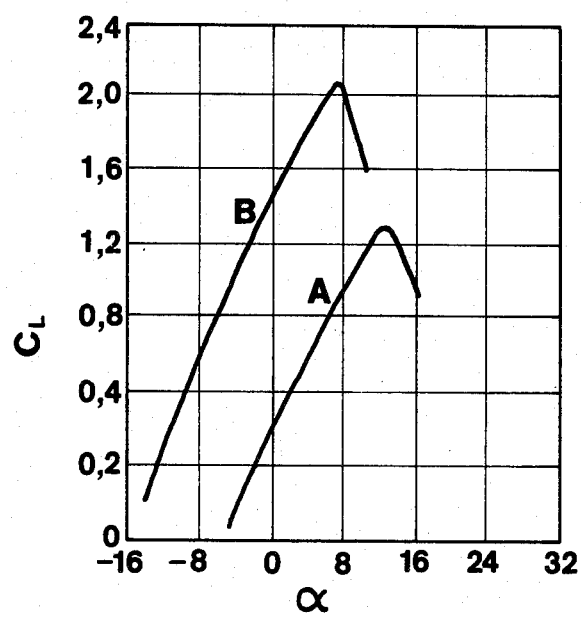
FIG. 1 is a diagram showing the change of the lift coefficient $C_L$ of a profile with and without tab, respectively A and B curves, as a function of the aerodynamic incidence angle of the profile.
Figure 2:
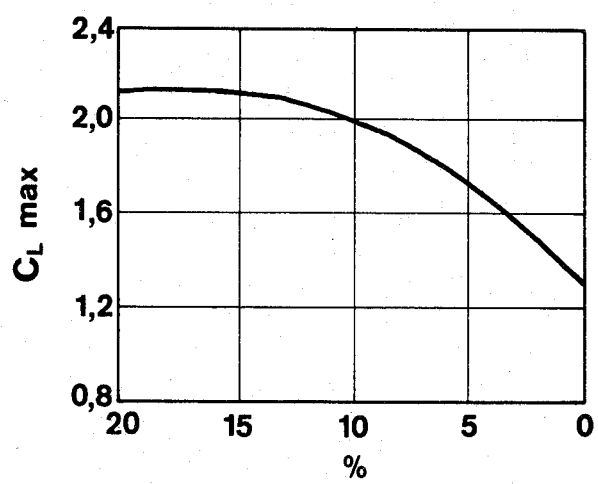
FIG. 2 shows the change of the mentioned coefficient $C_L$ as a function of the tab's width expressed as percentage of the profile chord.
Figure 3:
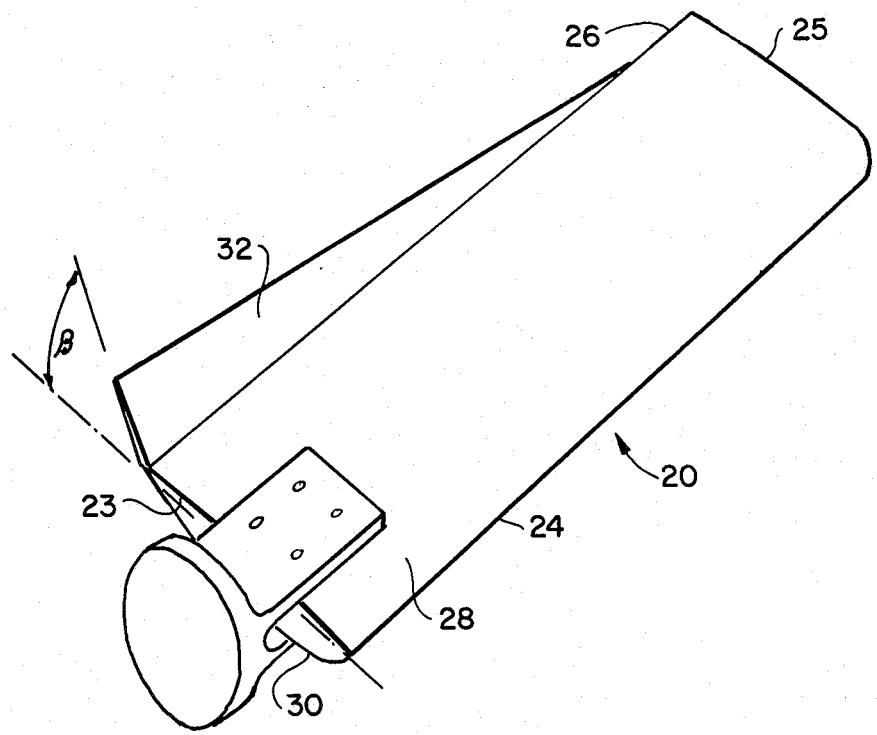
FIG. 3 shows a typical embodiment of the invention.
Figure 4:
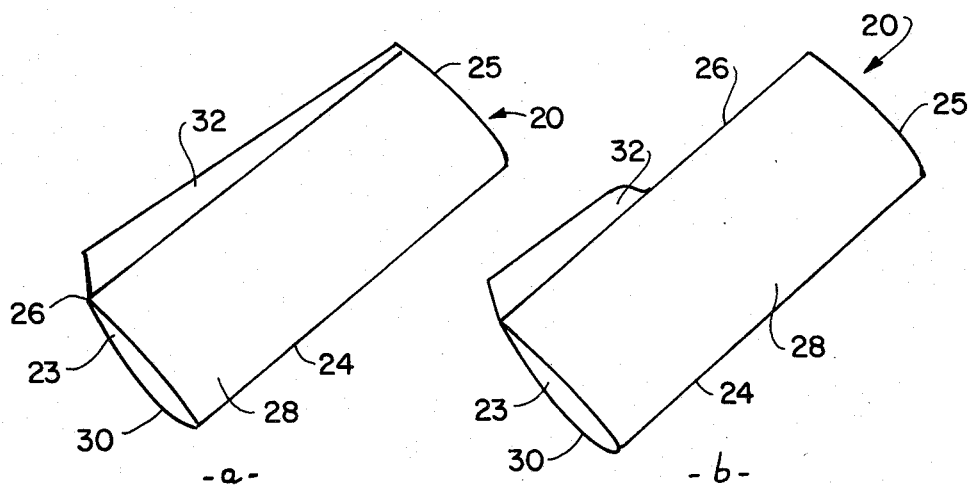
FIGS. 4a and b show further embodiments of the present invention.
Figure 7:
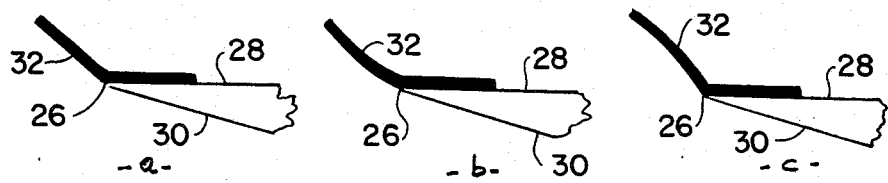
FIGS. 7a, b and c show different contours of the tab.

As can be seen in FIG. 10, blade 20 is secured to hub 22. Referring to FIGS. 3 through 9, the blade 20 is provided with a leading edge 24 and trailing edge 26, the width proximal end 23 and distal end 25. The leading and trailing edges are joined by an upper surface 28 and a lower convex surface 30. The lower surface 30 has a greater curvature than that of the upper surface 28. Tab 32 is secured to the trailing edge 26, and extends upwardly and outwardly from the trailing edge.

In the following description possible structures of the tab will be examined.

The tab can be applied to the trailing edge of the blade along its total length or part of its length (FIGS. 4a-4b).

The inclination of the tab in relation to the profile chord can be constant or variable along the blade's length.

The tab's width along the blade's length can be variable in a linear relationship (FIG. 5a), in a non-linear relationship (FIG. 5b) or a combination thereof.

The tab can be formed simply by bent plate (FIG. 6).

The mean line of the tab can be straight (FIG. 7a) or can have negative or positive curvature (FIGS. 7b-7c), or can be a combination thereof.

The constraint between tab and blade can be realized in such a way that the following options are allowed.

(a) the incidence angle between the tab and the blade is fixed and not adjustable;
(b) the incidence angle between the tab and the blade is adjustable when the propeller is still;
(c) the incidence angle between the tab and the blade is adjustable when the propeller is running.

Figure 8:
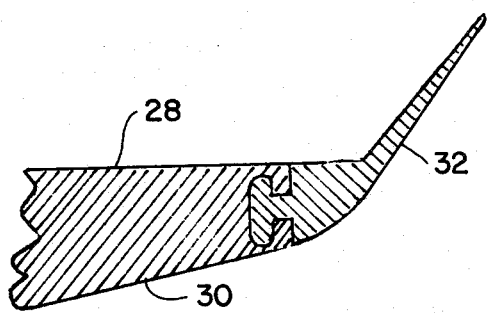
FIG. 8 shows a method of securing the tab to the blade.
Figure 9:
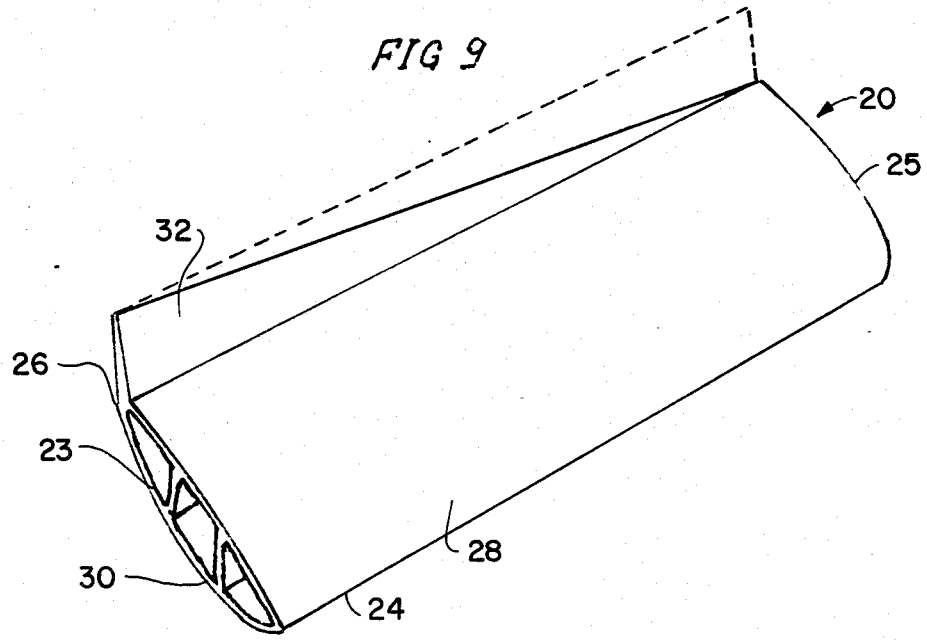
FIG. 9 shows another embodiment of the present invention.

The tab 32 can be fastened to the blade 20 by means of: glueing, riveting, bolting, welding, dovetailing and similar methods (see, for example, FIG. 8);

by combination of two or more of the above mentioned methods;

the tab 32 can be achieved also by removal of part of the trailing edge 26 of a blade, in which case it can be considered as integral part of the blade 2 itself (FIG. 9).

The inclination angle of the tab in relation to the profile chord can vary between 10° and 70°; the expected effect is not achieved when the angle is less than 10° and more than 70°, while the best results are obtained around 40°.

The width of the tab can vary from 0% to 30% (and above, in particular cases) of the blade's width.

EXAMPLE

The following example (see FIG. 10) will illustrate further the present invention without limiting the same thereto.

In FIG. 10 a schematic representation is given of the hub 22 and the blade 20 with tab of an axial propeller, equipped with four blades, used in the experiment.

The characteristics of the propeller are as follows:
r = radium 1.65 m
d = diameter of the hub 0.3 m
c = blade chord 0.3 m
s = maximum width of the tabs 0.070"
l = length of the tabs 1.0
$\beta$ = connection angle of the tabs 45°
n = revolution per minute 382

Figure 11:
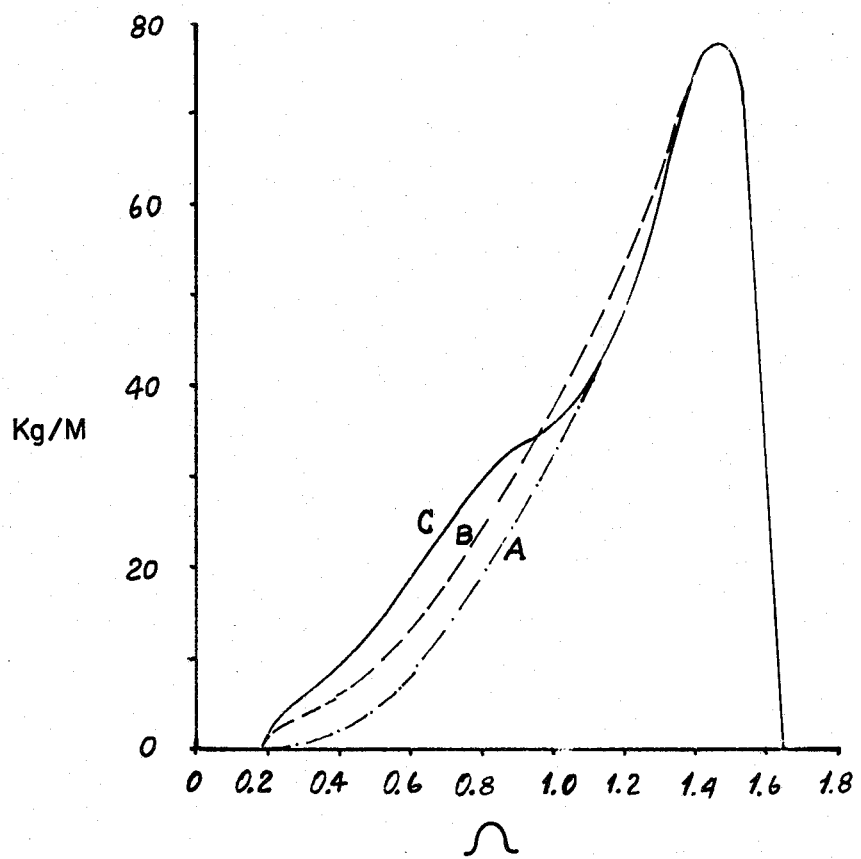
FIG. 11 shows the results of experimental tests conducted on the blade of FIG. 10 and two prior art device.

The results of the experiment are reported in the graphical representation of FIG. 11 with the radius r as abscissa and the effective displacement of air per opening unit (kg/m) as ordinate. In the Figure three diagrams are reported, which show the trend of the effective displacement per opening unit along the radius r, in the following conditions:

diagram A: blade not twisted, without tab;
diagram B: twisted blade, without tab;
diagram C: blade not twisted, with tab.

The increase of the effective displacement shown by diagram C, which represents the case of the present invention, is evident. When considering the diagram it results that in the case A the effective displacement of air increases at the increase of r; in the case B the effective displacement also increases with r, but is generally higher than A; in the case C the effective displacement for the tract of blade to which the tab is applied, is remarkably higher than for the case A and also higher than for the case B, while for the tract where no tab is present it becomes again coincident with the effective displacement of the case A.

What above means that by applying a tab of the type indicated, the effective displacement of air of the axial propeller has been increased in the zone near the hub having lower linear velocity: thus a more uniform distribution of air has been achieved and a better overall yield of the axial propeller.

I claim:
1. An axial propeller comprising:
a blade with constant inclination angle along its whole length (untwisted) and having a leading edge and a trailing edge, an upper surface and a convex lower surface which extend between said leading and trailing edges, said lower surface having a curvature greater than that of said upper surface, said blade having a proximal end for securing to a hub and a distal end and having a constant cross-section between said ends; and means for increasing the effective displacement of air generated by said blade near said proximal end, said means for increasing comprising a tab secured to said trailing edge of said blade, extending upwardly and outwardly from said trailing edge and having its maximum width toward the proximal end of the blade, its minimum width toward the distal end of the blade, said tab forming an angle of between 10° and 70° with the blade and located on the blade upper surface and the maximum width of the tab being not greater than about 30% of the width of the blade.

2. Axial propeller according to claim 1 in which the tab extends along the total length of the blade.

3. Axial propeller according to claim 1, in which the tab extends along part of the length of the blade.

4. Axial propeller according to claim 1, in which the tab is shaped as a right angle triangle whose bigger cathetus is fastened along the trailing edge of the blade.

5. An axial propeller comprising:
a blade with constant inclination angle along its whole length (untwisted) and having a leading edge and a trailing edge, an upper surface and a convex lower surface which extend between said leading and trailing edges, said lower surface having a curvature greater than that of said upper surface, said blade having a proximal end for securing to a hub and a distal end and having a constant cross-section between said ends; means for increasing the effective displacement of air generated by said blade near said proximal end, said means for increasing comprising a tab secured to said trailing edge of said blade, extending upwardly and outwardly from said trailing edge and having its maximum width toward the proximal end of the blade, its minimum width toward the distal end of the blade, said minimum being less than said maximum, said tab forming an angle of between 10° and 70° with the blade and the maximum width of the tab being not greater than about 30% of the width of the blade.

6. Axial propeller according to claim 5, in which the tab extends along the total length of the blade.

7. Axial propeller according to claim 5, in which the tab extends along part of the length of the blade.

8. Axial propeller according to claim 5, in which the tab is shaped as a right angle triangle whose bigger cathetus is fastened along the trailing edge of the blade.

* * * * *

UNITED STATES PATENT AND TRADEMARK OFFICE
CERTIFICATE OF CORRECTION

PATENT NO. : 4,618,313
DATED : October 21, 1986
INVENTOR(S) : Antonio Mosiewicz

It is certified that error appears in the above-identified patent and that said Letters Patent is hereby corrected as shown below:

On the face of the Patent between blocks 63 and 51 insert the following:

-- [30]   Foreign Application Priority Data
          February 6, 1980    Italy    19726  A/80  --.

Signed and Sealed this

Twelfth Day of September, 1989

Attest:

DONALD J. QUIGG

*Attesting Officer*      Commissioner of Patents and Trademarks